(12) United States Patent
Tonshal et al.

(10) Patent No.: US 10,916,073 B2
(45) Date of Patent: Feb. 9, 2021

(54) VEHICLE NETWORK DATA STREAMING SYSTEM

(71) Applicant: Ford Global Technologies, LLC, Dearborn, MI (US)

(72) Inventors: Basavaraj Tonshal, Northville, MI (US); Panduranga Kondoju, Westland, MI (US); Varun Chari, Novi, MI (US); Kamil Bernatowicz, Dearborn, MI (US); Christopher Ciurla, Warren, MI (US); Jennifer Danielle Shaw, Plymouth, MI (US); Thomas Fitzgibbons, Sunrise, FL (US)

(73) Assignee: Ford Global Technologies, LLC, Dearborn, MI (US)

( * ) Notice: Subject to any disclaimer, the term of this patent is extended or adjusted under 35 U.S.C. 154(b) by 206 days.

(21) Appl. No.: 15/968,391

(22) Filed: May 1, 2018

(65) Prior Publication Data

US 2019/0340844 A1 Nov. 7, 2019

(51) Int. Cl.
*G07C 5/00* (2006.01)
*H04L 29/06* (2006.01)
*G07C 5/08* (2006.01)

(52) U.S. Cl.
CPC .......... *G07C 5/008* (2013.01); *G07C 5/0808* (2013.01); *H04L 65/4069* (2013.01)

(58) Field of Classification Search
CPC ........ G07C 5/008; G07C 5/0808; G07C 5/08; H04L 65/4069
See application file for complete search history.

(56) References Cited

U.S. PATENT DOCUMENTS

| 5,649,105 | A | 7/1997 | Aldred et al. |
| 7,742,856 | B2 | 6/2010 | Fukuta et al. |
| 8,996,232 | B2* | 3/2015 | Dwan .................... G07C 5/008 701/29.1 |
| 9,305,408 | B2 | 4/2016 | Kwon et al. |
| 2003/0152112 | A1* | 8/2003 | Almog .................... H04L 25/14 370/535 |
| 2012/0213205 | A1* | 8/2012 | Tammisetti ........... H04W 88/06 370/332 |
| 2013/0282254 | A1* | 10/2013 | Dwan .................... G07C 5/008 701/101 |
| 2016/0087982 | A1* | 3/2016 | Takano ............. H04W 12/0608 726/3 |
| 2016/0098369 | A1 | 4/2016 | Aldred |
| 2017/0324817 | A1* | 11/2017 | Oliveira .................. H04L 67/10 |
| 2019/0126775 | A1* | 5/2019 | Han ........................ B60L 58/13 |

* cited by examiner

*Primary Examiner* — Austin J Moreau
(74) *Attorney, Agent, or Firm* — Michael Spenner; Brooks Kushman PC

(57) ABSTRACT

A vehicle system comprises a gateway controller, configured to collect real-time vehicle data from an electronic control unit (ECU); responsive to receiving a start token from a testing device, send the real-time vehicle data to the testing device via at least two connections of different types, each connection having a predetermined bandwidth; and inverse multiplex the real-time vehicle data into separate real-time data streams that match the predetermined bandwidth of each connection.

14 Claims, 3 Drawing Sheets

VEHICLE NETWORK DATA STREAMING SYSTEM

TECHNICAL FIELD

The present disclosure is generally related to a vehicle network data streaming system. More specifically, the present disclosure is related to a system for streaming vehicle network data to a testing device via wired or wireless connections.

BACKGROUND

Collecting and analyzing vehicle network data from various computers and electronic control units (ECUs) of a vehicle is essential for testing and diagnostic purposes. Engineers or technicians usually need real-time vehicle network data while the vehicle is operating for analysis. Due to security reasons, passive monitoring vehicle network data may be unsafe. In addition, the real-time vehicle network data for some vehicles may be enormous in size, beyond the bandwidth capacity of the current on-board diagnostics II (OBD-II) system.

SUMMARY

In one or more illustrative embodiments, a vehicle system comprises a gateway controller, configured to collect real-time vehicle data from an ECU; responsive to receiving a start token from a testing device, send the real-time vehicle data to the testing device via at least two connections of different types, each connection having a predetermined bandwidth; and inverse multiplex the real-time vehicle data into separate real-time data streams that match the predetermined bandwidth of each connection.

In one or more illustrative embodiments, a vehicle testing device comprises a processor, configured to connect to a vehicle via at least two connections of different types, each connection has a predetermined bandwidth; and receive separate real-time vehicle data streams from the at least two connections simultaneously; wherein separate real-time vehicle data streams are produced by multiplexing a single real-time vehicle data stream that match the predetermined bandwidth of each connection.

In one or more illustrative embodiments, a method for transmitting vehicle data comprises collecting real-time vehicle data from an ECU; and responsive to receiving a start token from a testing device, sending the real-time vehicle data to the testing device via at least two connections of different types, each connection having a predetermined bandwidth; and inverse multiplexing the real-time vehicle data into separate real-time data streams that match the predetermined bandwidth of each connection.

BRIEF DESCRIPTION OF THE DRAWINGS

For a better understanding of the invention and to show how it may be performed, embodiments thereof will now be described, by way of non-limiting example only, with reference to the accompanying drawings, in which.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The present disclosure generally provides for a plurality of circuits or other electrical devices. All references to the circuits and other electrical devices, and the functionality provided by each, are not intended to be limited to encompassing only what is illustrated and described herein. While particular labels may be assigned to the various circuits or other electrical devices. Such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programmed to perform any number of the functions as disclosed.

The present disclosure, among other things, proposes a vehicle network data streaming system. More specifically, the present disclosure proposes a system for streaming real-time vehicle network data to a testing device via wired or wireless connections.

Figure 1:
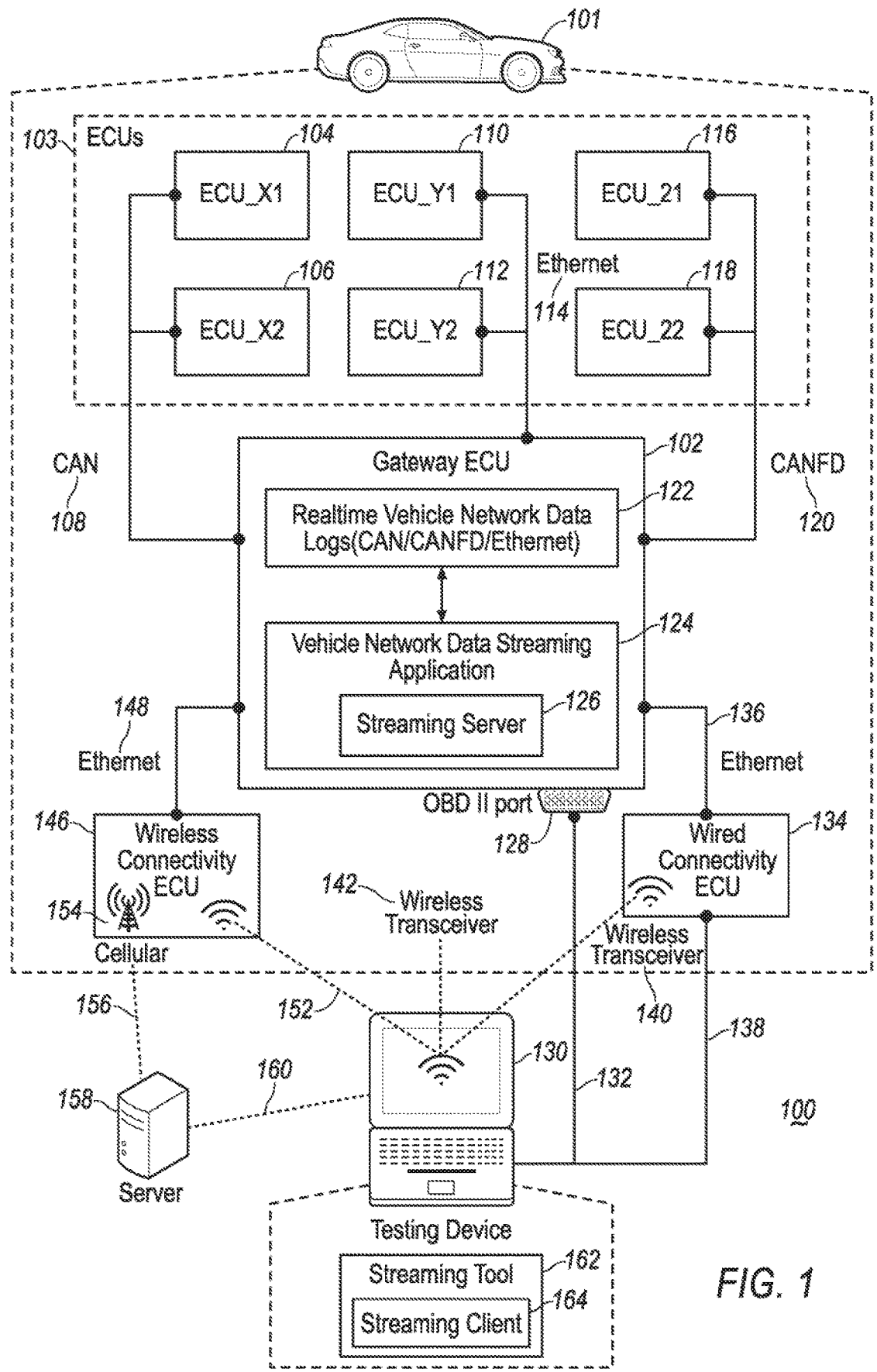
FIG. 1 illustrates an example block topology of a vehicle network data streaming system of one embodiment of the present disclosure.

Referring to FIG. 1, an example block topology of the vehicle network data streaming system 100 for a vehicle platform 101 of one embodiment of the present disclosure is illustrated. The system 100 may generally include a gateway ECU 102, a wired connectivity ECU 134 and a wireless connectivity ECU 146. The gateway ECU 102 is connected to various ECUs 103 via different types of in-vehicle network to collect data from them. For instance, the gateway ECU 102 may be connected to ECU_X1 104 and EC_X2 106 via a controller area network (CAN) 108. The gateway ECU 102 may be connected to ECU_Y1 110 and ECU_Y2 112 via an ethernet 114. The gateway ECU 102 may be connected to ECU_Z1 116 and ECU_Z2 118 via a controller area network with flexible data rate (CANFD) 120. Some of examples of the above-mentioned ECUs 103 may include an engine control module (ECM); a body control module (BCM); a human-machine interface (HMI); a powertrain control module (PCM); a battery management unit (BMU); a brake control module (BCM) including or associated with an anti-lock braking system (ABS) and/or an electronic stability controls (ESC); central timing module (CTM); general electronic module (GEM); suspension control module (SCM); and a telematic control unit (TCU). It is noted that the above-mentioned ECUs and in-vehicle networks are merely examples for illustration purposes, and more, fewer, and/or differently located elements may be used.

The gateway ECU 102 may include a real-time vehicle network data logger 122 configured to collect, serialize, multiplex, time-stamp, and buffer the real-time vehicle network data from ECUs 103. For instance, the vehicle network data maybe serialized using a GOOGLE protocol buffers (Protobuf) message structure. The real-time network data logger 122 may be further configured to store the vehicle network data in a computer-readable medium (not shown, also referred to as a processor-readable medium or storage) which may include any non-transitory medium (e.g., tangible medium) to provide data storage capability. A vehicle network data streaming application 124 of the gateway ECU 102 may also be stored in the same or a different computer readable medium to provide data streaming services using a streaming server 126. The streaming server 126 may be configured to communicate with the vehicle network data logger and convert the real-time vehicle data into multiple data streams to send out.

The gateway ECU 102 may be configured to support an OBD (e.g., OBD-II) port 128 configured to communicate with a testing device 130 used by a technician to perform testing and diagnosis via a wired connection 132. For instance, the testing device 130 may be any electronic device having data processing capability configured to receive and process the network data received from the gateway ECU 102 using compatible software stored locally or obtained from the cloud. A few non-limiting examples of the testing device 130 may include a laptop computer, a desktop computer, a server, a tablet, and a mobile phone. The testing device 130 may be configured to receiving and multiplex multiple data streams from the gateway ECU 102 using a streaming client 164 as a part of the streaming tool 162.

Additionally, the gateway ECU 102 may be further configured to communicate with the testing device 130 via one or more connectivity ECUs. As illustrated in FIG. 1, the gateway ECU 102 is connected to the wired connectivity ECU 134 via a ethernet connection 136 and the wireless connectivity ECU 146 via a ethernet connection 148. It is noted that although both connections 136 and 148 are of the ethernet type in the example illustrated in FIG. 1, different types of in-vehicle network may be used.

The wired connectivity ECU 134 may be provided with connectivity capability to communicate with the testing device 130 via a wired connection 138. As a few non-limiting examples, the wired connection 138 may be a universal serial bus (USB), an ethernet, an OBD, or other types of wired connections. Additionally or alternatively, the wired connectivity ECU 134 may be provided with a wireless transceiver 140 in support of wireless communication protocols configured to communicate with a compatible wireless transceiver 142 of the testing device 130 via a wireless connection 144. For instance, the wireless transceiver 140 may support one or more of the following types: WiFi; Bluetooth; cellular; near-field communication (NFC); radio-frequency identification (RFID); or dedicated short range communications (DSRC). The wired connectivity ECU 134 may be configured to communicate with one or more testing devices 130 using both the wired connection 138 and the wireless connection 144 simultaneously to increase the bandwidth and speed of the data communication.

The wireless connectivity ECU 146 may be provided with a wireless transceiver 150 configured to communicate with the compatible wireless transceiver 142 of the testing device 130 via a wireless connection 152. Similar to the wireless transceiver 140 of the wired connectivity ECU 134, the wireless transceiver 150 may support one or more of the following types: WiFi; Bluetooth; cellular; NFC; RFID; or DSRC as a few non-limiting examples. Additionally, the wireless connectivity ECU 146 may be provided with a cellular controller 154 configured to communicate with a server 158 via a cellular network 156. For illustration purposes, the cellular controller 154 is separated from the wireless transceiver 150 in the example in FIG. 1. It is note that the cellular controller 154 may be integrated with the wireless transceiver 150 in other examples. The testing device 130 may be configured to communicate with the server 158 via a network connection 160. Each of the above wired or wireless connection has a predetermined bandwidth that is available to the streaming server 126. The streaming server 126 may be configured to inverse multiplex the real-time vehicle network data into multiple data streams using the bandwidth of the multiple connections to send out via the connections.

Using the configuration of the vehicle network data streaming system 100 illustrated in FIG. 1, the testing device 130 may be simultaneously connected to the gateway ECU 102 of the vehicle platform 101 via various connections and receive real-time data stream via the various connections in parallel. For instance, the testing device 130 may be connected to the gateway ECU 102 via the OBD-II port 128, while receiving real-time vehicle network data from the wireless connectivity ECU 148 via the wireless connection 152, as well as the server 158 via the network connection 160. In this way, the capacity for the testing device 130 to receive real-time vehicle network data from the vehicle platform 101 may be greatly increased.

Figure 2:
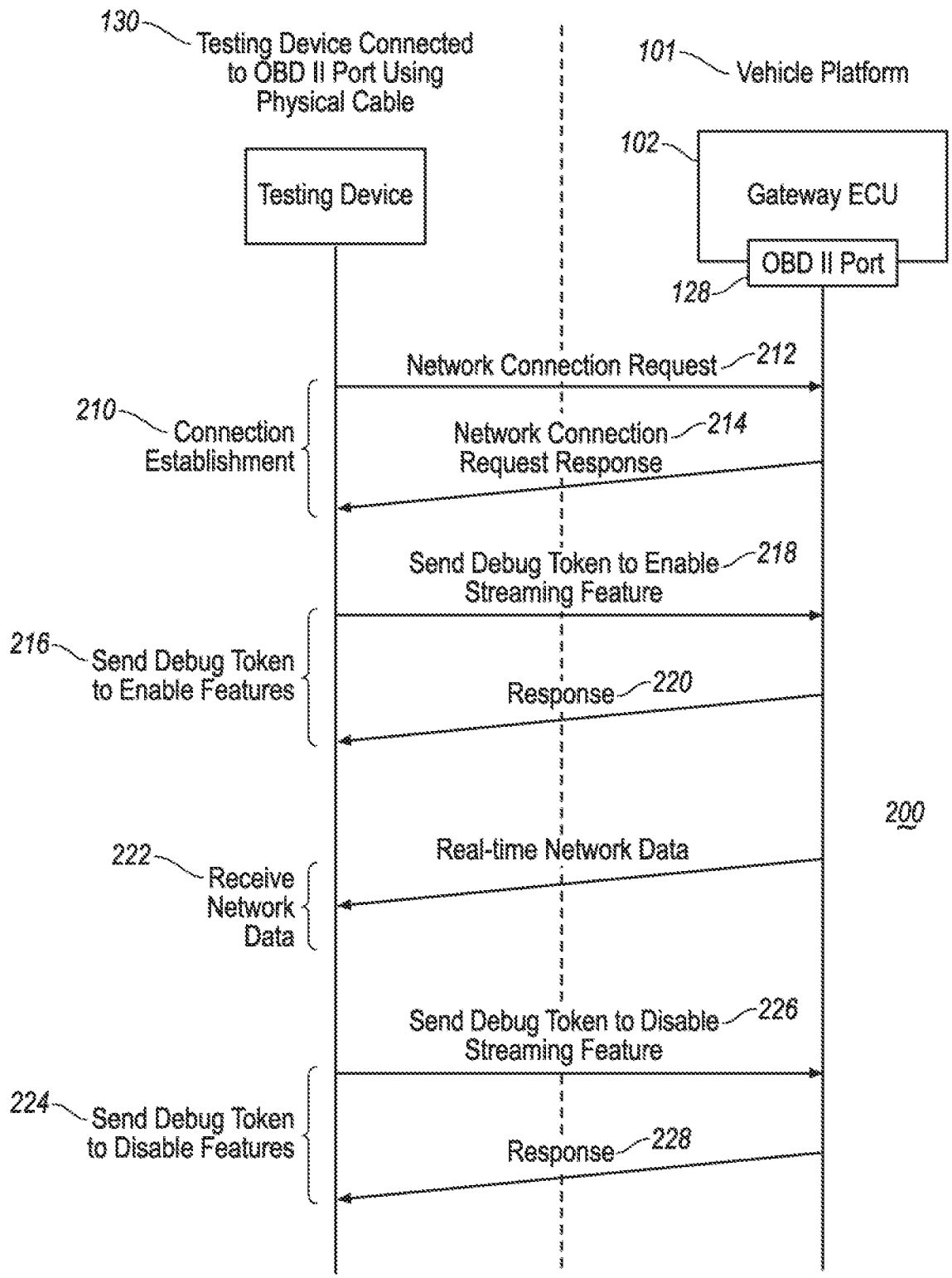
FIG. 2 illustrates an example data flow diagram of a vehicle network data streaming process of one embodiment of the present disclosure.

Referring to FIG. 2 an example data flow diagram of a vehicle network data streaming process 200 of one embodiment of the present disclosure is illustrated. With continuing reference to FIG. 1, in this example, the testing device 130 is connected to the vehicle platform 101 on the OBD-II port 128 via a physical cable 132. The process 200 may be generally divided into four sets of operations: connection establishment 210; communication enabling 216; vehicle network data streaming 222; and communication disabling 224.

At operation 212, the testing device 130 sends a network connection request to the gateway ECU 102 of the vehicle platform 101 via the OBD-II port 128 to establish the connection 132. responsive to receiving the network connection request, at operation 214, the gateway ECU 102 sends a network connection request response back to the testing device acknowledging the approval of the connection establishment.

Next, at operation 218, the testing device 130 sends a first debug token to the gateway ECU 102 to enable the streaming feature. The debug token may function as a security feature by including a digital authorization certificate and/or security signature to allow the gateway ECU to recognize and verify the authenticity of the debug token. In addition, the debug token may also include streaming instructions to start the real-time vehicle network data streaming to the testing device. The debug token may instruct the gateway ECU 102 not only to stream the vehicle network data via the OBD-II port, but also to start to stream via other connections as described above with reference to FIG. 1. For instance, the testing device 130 may instruct the gateway ECU 102 to activate the ethernet connection 138 and wireless transceiver 140 of the wired connectivity ECU 134 to start streaming real-time vehicle network data. At operation 220, the gateway ECU 102 sends a response to the testing device 130 acknowledging the receipt of the debug token and the activation of the streaming services.

At operation 222, the gateway ECU 102 streams the real-time vehicle network data to the testing device 130 using the streaming server 126 as a part of the streaming application 124 via the previously configured connections.

To stop the data streaming, at operation 226, the testing device 130 sends a second debug token to the gateway ECU 102 instructing to stop the vehicle network data streaming. Responsive to the second debug token, at operation 228, the gateway ECU 102 deactivate the streaming connections and sends a response to the testing device 130 acknowledging the deactivation.

The operation vehicle network data streaming process 200 may be applied to various situations. In one example, a technician wants to connect his testing device 130 onto the gateway ECU 102 of the vehicle 101 to collect real-time network data from various ECUs 103 for testing and diagnostic purposes. Although the vehicle platform 101 supports various wired and wireless data streaming services, for security reasons, those services may be configured to be deactivated by default. To activate the data streaming services, the technician needs to first connect to the gateway ECU 102 of the vehicle platform 101 via a wired physical connection (e.g. via the OBD-II port 128).

After plugging the testing device 130 into the compatible physical port of vehicle platform 101, the testing device 130 may automatically establish a digital connection with the vehicle platform 101. Next, the technician may input instructions via the testing device 130 to activate certain wired or wireless connections (e.g. ethernet or WiFi) for vehicle network data streaming purposes. Responsive to the technician input, the testing device may send commands in form of a debug token to the gateway ECU 102, which in turn may verify the authenticity of the debug token, and activate the requested connections and allow the testing device 130 to connect responsive to a successful verification. Next, the gateway ECU 102 may start to stream the real-time vehicle network data collected by the logger 122 to the testing device via the requested connections using the streaming server 126 as a part of the data streaming application. The server 126 inverse multiplex the data into multiple data streams for the requested connections and send them out via the connections. The testing device 130 may receive the data streams via the steaming client and multiplex the streams into a single real-time data stream, and store it for testing and diagnostic purposes. After enough data is collected and the technician wants to stop the streaming, he/she may instruct the testing device 130 to send deactivation instructions in form of a second debug token to the vehicle platform 101. In response, the gateway ECU 102 may stop the data streaming and send a response to the testing device.

Figure 3:
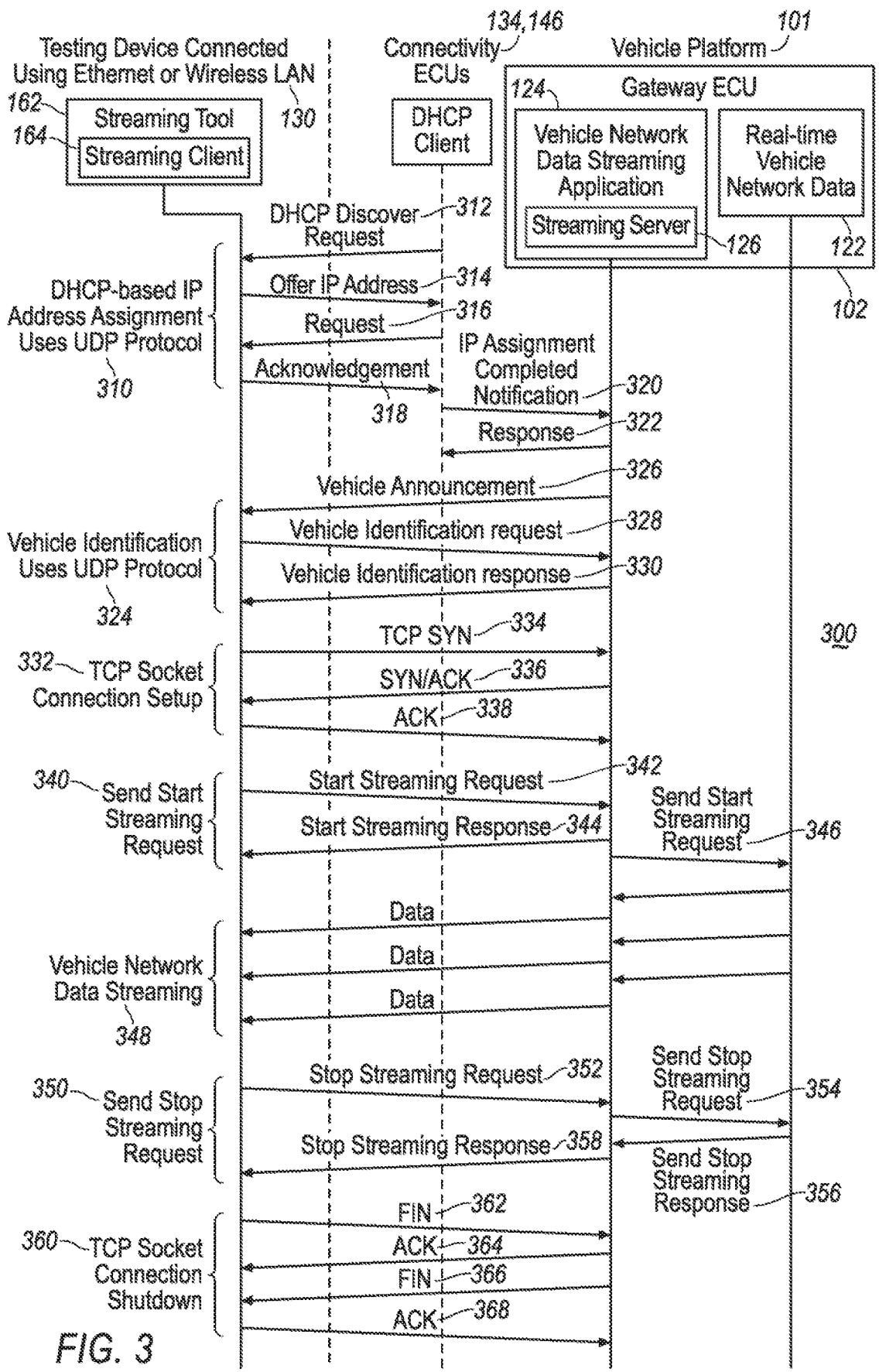
FIG. 3 illustrates an example data flow diagram of a vehicle network data streaming process of another embodiment of the present disclosure.

Referring to FIG. 3 an example data flow diagram of a vehicle network data streaming process 300 of another embodiment of the present disclosure. In this example, the testing device 130 is connected to the vehicle platform 101 via ethernet or wireless connections. First, at operation 310, the testing device assigns a dynamic host configuration protocol (DHCP) based internet protocol (IP) address using user datagram protocol (UDP) to the gateway ECU 102 via one or more of the connectivity ECUs 134, 146. It is noted that the protocols discussed with the present embodiment are merely examples, and other wired or wireless connection protocols may be used. At operation 312, one of the connectivity ECUs 134, 146 sends a DHCP discover request to the testing device 130. In response, at operation 314, the testing device 130 sends offers an IP address. At operation 316, the connectivity ECU 134, 146 sends a request for IP address to the testing device 130, which sends back an acknowledgement in response at operation 318. At operation 320, the connectivity ECU 134, 146 sends a IP assignment completed notification to the gateway ECU 102. At operation 322, the gateway ECU 102 respond with an acknowledgement.

After a successful IP address assignment, next at operation 324, the testing device 130 identifies the correct vehicle 101 using UDP protocol. At operation 326, the gateway ECU 102 sends a vehicle announcement to the testing device. Responsive to receiving the vehicle announcement, the testing device 130 sends a vehicle identification request to the gateway ECU 102 at operation 328. At operation 330, the gateway ECU 102 sends a vehicle identification response to the testing device 130 to complete the vehicle identification.

For the accuracy and reliability of the vehicle network data streaming, the transmission control protocol (TCP) may be preferred over the UDP for real-time vehicle network data streaming. Therefore, in the current example, at operation 332, the next step is to setup a TCP socket connection by performing a TCP three-way handshake between the testing device and the gateway ECU 102. At operation 334, the testing device 130 sends a TCP SYN message to the gateway ECU 102. In response, at operation 336, the gateway ECU 102 sends back a SYN/ACK message. At operation 338, the testing device 130 sends an ACK message to finish the TCP handshake and establish the TCP socket connection.

After a successful setup of the TCP socket connection, at operation 340, the testing device 130 requests to start streaming by sending a start streaming request at operation 342. At operation 344, the gateway ECU 102 sends a response to the testing device 130. At operation 346, the gateway ECU 102 sends a start streaming request from the vehicle network data streaming application 124 internally to the real-time vehicle network data logger 122. In response, at operation 348, the real-time network vehicle data from the logger 122 is streamed from the streaming server 126 of the gateway ECU 102 to the streaming client 164 of the testing device 130.

When enough vehicle network data is collected, the testing device 130 may send a stop streaming request at operation 352. Responsive to receiving the request, the streaming server 126 internally sends a stop streaming request to the vehicle network data logger 122. At operation 256, the vehicle network data logger 122 stops the streaming and sends a stop streaming response to the streaming server 126, which in turn respond the stop streaming to the testing device 130 at operation 358.

At operation 360, the TCP socket connection between the testing device 130 and the gateway ECU 102 is shut down to complete the process. At operation 362, the testing device 130 sends a FIN message to the gateway ECU 102, which responds with a ACK message at operation 364. At operation 366, the gateway ECU 102 sends a FIN message to the testing device 130, which responds with a ACK message at operation 364.

While exemplary embodiments are described above, it is not intended that these embodiments describe all possible forms of the invention. Rather, the words used in the specification are words of description rather than limitation, and it is understood that various changes may be made without departing from the spirit and scope of the invention.

Additionally, the features of various implementing embodiments may be combined to form further embodiments of the invention.

What is claimed is:

1. A vehicle system, comprising:
   a wired transceiver configured to establish a wired connection having a first bandwidth to a testing device;
   a wireless transceiver configured to establish a wireless connection having a second bandwidth to the testing device; and
   a gateway controller, configured to
      collect real-time vehicle data from a first electronic control unit (ECU) via a first vehicle network and from a second ECU via a second vehicle network different from the first vehicle network,
      responsive to receiving a start token from a testing device via one of the wired connection or wireless connection requesting for the real-time vehicle data from the first and second ECUs, inverse multiplex the real-time vehicle data into a first stream for the wired connection based on the first bandwidth and a second stream for the wireless connection based on the second bandwidth, and
      send, to the testing device, the first stream via the wired connection and the second stream via the wireless connection.

2. The vehicle system of claim 1, wherein the gateway controller includes a real-time vehicle data logger, programmed to collect, serialize, multiplex, time-stamp, and buffer the real-time vehicle data.

3. The vehicle system of claim 2, wherein the gateway controller includes a streaming server programmed to convert the real-time vehicle data from the real-time vehicle data logger into first and second streams.

4. The vehicle system of claim 1, wherein the wireless connection includes at least one of the following types: WiFi; Bluetooth; cellular; near-field communication (NFC); radio-frequency identification (RFID); or dedicated short range communications (DSRC).

5. The vehicle system of claim 1, wherein the wired connection includes at least one of the following types: ethernet; on-board diagnostics (OBD); or universal serial bus (USB).

6. The vehicle system of claim 1, wherein the gateway controller is further configured to authenticate the start token from the testing device.

7. The vehicle system of claim 1, wherein the gateway controller is further configured to receive and authenticate a stop token from the testing device, and responsive to a successful authentication stop sending the first and second streams.

8. A vehicle testing device, comprising:
   a wired transceiver configured to establish a wired connection having a first bandwidth to a vehicle;
   a wireless transceiver configured to establish a wireless connection having a second bandwidth to the vehicle; and
   a processor, configured to
      send a start token to the vehicle indicative an intent to receive real-time vehicle data from plurality of ECUs,
      receive a first stream via the wired connection, the first stream being corresponding to the first bandwidth and representative of a first part of the real-time vehicle data,
      receive a second stream via the wireless connection, the second stream being corresponding to the second bandwidth and representative of a second part of the real-time vehicle data,
      multiplex the first stream and the second stream to obtain the real-time vehicle data.

9. The vehicle testing device of claim 8, wherein the processor is further configured to multiplex the first and second streams into a single transmission control protocol/internet protocol (TCP/IP) data stream represent of the real-time vehicle data, using a binary serialization method.

10. The vehicle testing device of claim 8, wherein the wireless connection includes at least one of the following types: WiFi; Bluetooth; cellular; near-field communication (NFC); radio-frequency identification (RFID); or dedicated short range communications (DSRC).

11. The vehicle testing device of claim 8, wherein the wired connection includes at least one of the following types: ethernet; an on-board diagnostics (OBD); or universal serial bus (USB).

12. A method for a vehicle to transmit vehicle data to a testing device, comprising:
   establishing a first connection having a first bandwidth to the testing device;
   establish a second connection having a second bandwidth to the testing device;
   collecting real-time vehicle data from a first electronic control unit (ECU) via a first vehicle network and from a second ECU via a second vehicle network different from the first vehicle network; and
   responsive to receiving a start token from a testing device indicative of an intent to receive the real-time vehicle data from the first and second ECUs, inverse multiplexing the real-time vehicle data into a first stream for the first connection based on the first bandwidth and a second stream for the second connection based on the second bandwidth,
   sending, to the testing device, the first stream via the first connection and the second stream via the second connection.

13. The method of claim 12, wherein the first connection is a wireless connection of at least one of the following types: WiFi; Bluetooth; cellular; near-field communication (NFC); radio-frequency identification (RFID); or dedicated short range communications (DSRC).

14. The method of claim 12, wherein the second connection is a wired connection of at least one of the following types: ethernet; on-board diagnostics (OBD); or universal serial bus (USB).

* * * * *